United States Patent
Li et al.

(10) Patent No.: US 9,577,909 B2
(45) Date of Patent: Feb. 21, 2017

(54) SYSTEM AND METHOD OF TRAFFIC INSPECTION AND STATEFUL CONNECTION FORWARDING AMONG GEOGRAPHICALLY DISPERSED NETWORK APPLIANCES ORGANIZED AS CLUSTERS

(75) Inventors: Qing Li, Cupertino, CA (US); Preety Mordani, Sunnyvale, CA (US); Yusheng Huang, San Jose, CA (US); Howard Chen, Milpitas, CA (US)

(73) Assignee: Symantec Corporation, Mountain View, CA (US)

( * ) Notice: Subject to any disclaimer, the term of this patent is extended or adjusted under 35 U.S.C. 154(b) by 313 days.

(21) Appl. No.: 13/408,920

(22) Filed: Feb. 29, 2012

(65) Prior Publication Data

US 2012/0226820 A1 Sep. 6, 2012

Related U.S. Application Data (62) Division of application No. 11/834,576, filed on Aug. 6, 2007, now Pat. No. 8,130,747.

(51) Int. Cl.
*H04L 12/26* (2006.01)
*H04L 12/24* (2006.01)
*H04L 29/08* (2006.01)
*H04L 29/06* (2006.01)
*H04L 29/12* (2006.01)

(52) U.S. Cl.
CPC ............ *H04L 43/12* (2013.01); *H04L 41/0893* (2013.01); *H04L 67/1002* (2013.01); *H04L 67/1008* (2013.01); *H04L 67/1023* (2013.01); *H04L 69/162* (2013.01); *H04L 29/12367* (2013.01);

(Continued)

(58) Field of Classification Search
USPC .............................. 370/230; 726/3; 709/228
See application file for complete search history.

(56) References Cited

U.S. PATENT DOCUMENTS 6,038,625 A 3/2000 Ogino et al.
6,324,162 B1 11/2001 Chaudhuri
(Continued)

OTHER PUBLICATIONS

Perkins, C., Belding-Royer, E., and Das, S. Ad Hoc On-Demand Distance Vector (AODV) Routing. Jul. 2003. RFC 3561. Network Working Group.

(Continued)

*Primary Examiner* — Hassan Kizou
*Assistant Examiner* — Ashil Farahmand
(74) *Attorney, Agent, or Firm* — Baker Botts L.L.P.

(57) ABSTRACT

A peering relationship among two or more network appliances is established through an exchange of control messages among the network appliances. The peering relationship defines a cluster of peered network appliances, and at each network appliance of the cluster traffic flow state information for all the network appliances of the cluster is maintained. Network traffic associated with traffic flows of the network appliances of the cluster is managed according to the state information for the traffic flows. This managing of the network traffic may include forwarding among the network appliances of the cluster (i.e., to those of the appliances handling the respective flows) at least some of the network traffic associated with one or more of the traffic flows according to the state information for the one or more traffic flows. The traffic flows may be TCP connections or UDP flows.

20 Claims, 6 Drawing Sheets

(52) U.S. Cl.
CPC ........ *H04L 41/5003* (2013.01); *H04L 61/2514* (2013.01); *H04L 67/1014* (2013.01)

(56) References Cited

U.S. PATENT DOCUMENTS

| | | |
|---|---|---|
| 6,687,732 B1 | 2/2004 | Bector et al. |
| 6,751,729 B1* | 6/2004 | Giniger et al. ............... 713/153 |
| 6,795,415 B1 | 9/2004 | Suonvieri |
| 6,823,185 B1 | 11/2004 | Comer et al. |
| 6,904,464 B1 | 6/2005 | Van Langen et al. |
| 7,653,075 B2 | 1/2010 | Singh et al. |
| 2002/0032855 A1 | 3/2002 | Neves et al. |
| 2002/0083371 A1 | 6/2002 | Ramanathan et al. |
| 2003/0091026 A1* | 5/2003 | Penfield .............. H04L 12/6418 370/352 |
| 2003/0217149 A1* | 11/2003 | Crichton et al. ............. 709/225 |
| 2003/0231628 A1 | 12/2003 | Harada et al. |
| 2005/0018651 A1 | 1/2005 | Yan et al. |
| 2005/0135268 A1 | 6/2005 | Simon et al. |
| 2005/0276215 A1 | 12/2005 | Kitani et al. |
| 2006/0083247 A1 | 4/2006 | Mehta |
| 2007/0180495 A1* | 8/2007 | Hardjono et al. ................ 726/3 |
| 2008/0077705 A1 | 3/2008 | Li et al. |
| 2008/0244085 A1 | 10/2008 | Li et al. |

OTHER PUBLICATIONS

Moy, J. OSPF Version 2. Apr. 1998. RFC 2328. Network Working Group.

Wikipedia.org. TCP and UDP Port. Sep. 15, 2006. <http://web.archive.org/web/20060915083215/http://en.wikipedia.org/wiki/TCP_and_UDP_port>.

Simpson, W.:IP in IP Tunneling; Oct. 1995; RFC. 1853; Network Working Group 8pp.

Moy, J., "Multicast Extensions to OSPF", RFC 1584, Mar. 1994, 70 pages.

* cited by examiner

| Message Type | Action Type | Protocol Family 46 | Address Family 48 |
|---|---|---|---|
| 0  7 8 | 15 16 | 23 24 | 31 |

INSTALL_CONNECTION  FORWARD
STATIC_BYPASS
DYNAMIC_BYPASS

REMOVE_CONNECTION  FORWARD
STATIC_BYPASS
DYNAMIC_BYPASS

FIG. 5

| 0 | 7 8 | 15 16 | 23 24 | 31 |
|---|---|---|---|---|
| INSTALL_CONNECTION | FORWARD | IPPRPTO_TCP / IPPROTO_UDP | AF_INET / AF_INET6 | |
| Source Port | | | Destination Port | |
| Source IPv4 Address / Source IPv6 Address | | | | |
| Destination IPv4 Address / destination IPv6 Address | | | | |

FIG. 6A

| 0 | 7 8 | 15 16 | 23 24 | 31 |
|---|---|---|---|---|
| REMOVE_CONNECTION | FORWARD | IPPRPTO_TCP / IPPROTO_UDP | AF_INET / AF_INET6 | |
| Source Port | | | Destination Port | |
| Source IPv4 Address / Source IPv6 Address | | | | |
| Destination IPv4 Address / destination IPv6 Address | | | | |

FIG. 6B

| 0 | 7 8 | 15 16 | 23 24 | 31 |
|---|---|---|---|---|
| CLUSTER_PEER_SYNC | PEER_JOIN | Version 50 | (zero) | |

FIG. 7A

| 0 | 7 8 | 15 16 | 23 24 | 31 |
|---|---|---|---|---|
| CLUSTER_PEER_SYNC | PEER_KEEPALIVE | (zero) | (zero) | |

FIG. 7B

| 0 | 7 8 | 15 16 | 23 24 | 31 |
|---|---|---|---|---|
| CLUSTER_PEER_SYNC | PEER_LEAVE | Error Code | (zero) | |

FIG. 7C

| 0 | 7 8 | 15 16 | 23 24 | 31 |
|---|---|---|---|---|
| CLUSTER_PEER_SYNC | PEER_REJECT | Error Code 52 | (zero) | |

SYSTEM AND METHOD OF TRAFFIC INSPECTION AND STATEFUL CONNECTION FORWARDING AMONG GEOGRAPHICALLY DISPERSED NETWORK APPLIANCES ORGANIZED AS CLUSTERS

RELATED APPLICATIONS

This application is a DIVISIONAL of U.S. patent application Ser. No. 11/834,576, filed 6 Aug. 2007 (now issued as U.S. Pat. No. 8,130,747), incorporated herein by reference.

FIELD OF THE INVENTION

The present invention relates to systems and methods for TCP connection forwarding in asymmetrically routed and other environments.

BACKGROUND

A common problem facing organizations with large enterprise networks is the problem of asymmetric routing. Such a situation can occur in a variety of contexts, but often occurs where an enterprise obtains Internet connectivity from multiple Internet Service Providers (ISPs); in other words, when the enterprise has multiple address prefixes.

Figure 1:
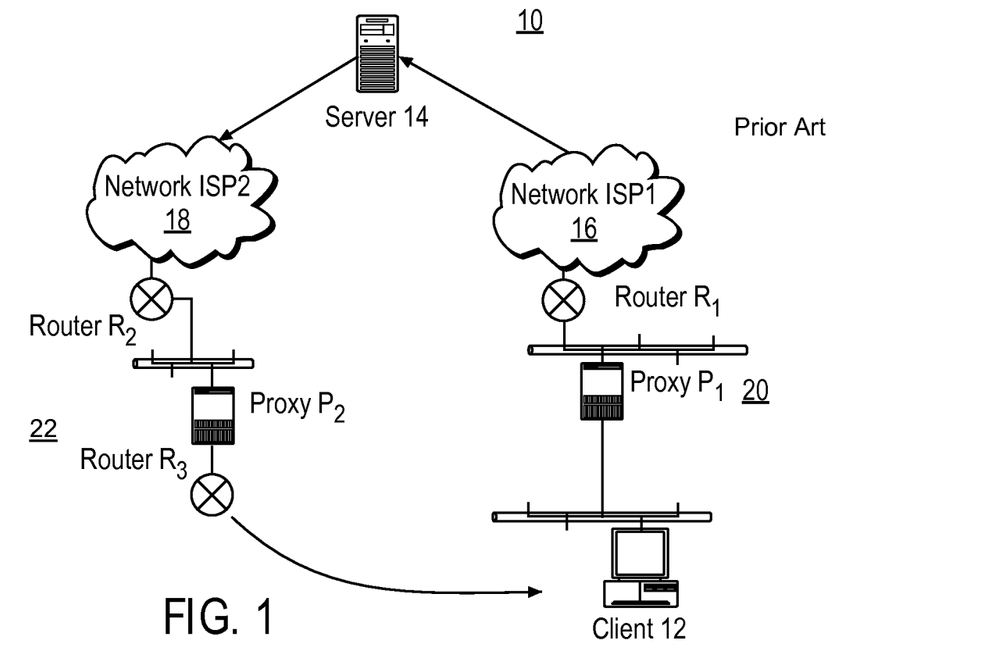
FIG. 1 illustrates a multi-ISP environment prone to the problem of asymmetric routing.

Refer, for example, to FIG. 1. This illustration depicts a multi-ISP environment 10 in which an enterprise network includes two proxy devices P1 and P2, which provide connectivity for a client 12 to a server 14 via two ISPs 16 and 18, respectively. Of course, this illustration depicts a rather straightforward routing path (from P1 through router R1, and from R3 through P2 and R2) for each ISP connection, whereas in other deployment scenarios the routing paths may be more complex. In any such deployment, however, the different proxy devices are likely to reside on different network segments 20, 22. This poses a problem when the proxies employ client IP spoofing.

With client IP spoofing, once a connection from the client 12 to proxy P1 is intercepted and terminated, the outbound connection from P1 to server 14 will carry the client's IP address. As such, the return traffic could traverse a completely different path (e.g., through ISP 18, router R2, proxy P2 and router R3) than was traversed by the forward direction traffic. Indeed, the return traffic path will depend entirely on the configuration at the node to which the outbound connection is destined (i.e., server 14). Consequently the return traffic may not reach the proxy that intercepted the original request.

When proxy P2 receives the return traffic from server 14, it will have no connection reference with which to associate that traffic. That is, P2 will not have any state information concerning the connection for which the traffic from the server is intended. Consequently, P2 will not forward the traffic to the requesting client 12 and, instead, is likely to reject it because a proxy that is acting as a security device must be conservative regarding the types of traffic to be allowed through. Moreover, when proxy P1 (as well as client 12) fails to receive anything from the server 14, these outbound connections may eventually timeout because no return traffic will have been received.

Depending on the enterprise network configuration, asymmetric routing may occur on the inbound connections (from the server to the client) as well as on the outbound connections (from the client to the server). In such a case, traffic originated by a particular client may not reach a proxy device that was intercepting traffic from a server. This would, again, trigger incorrect connection resets. What is needed is a solution for such asymmetric routing situations.

SUMMARY OF THE INVENTION

In one embodiment of the present invention, a peering relationship among two or more network appliances is established through an exchange of control messages among the network appliances. The peering relationship defines a cluster of peered network appliances, and at each network appliance of the cluster traffic flow state information for all the network appliances of the cluster is maintained. Network traffic associated with traffic flows of the network appliances of the cluster is managed according to the state information for the traffic flows. This managing of the network traffic may include forwarding among the network appliances of the cluster (i.e., to those of the appliances handling the respective flows) at least some of the network traffic associated with one or more of the traffic flows according to the state information for the one or more traffic flows. The traffic flows may be TCP connections or UDP flows.

In some cases, the peering relationship may be established statically, through configuration of the network appliances. Also, the peering relationship is established through full mesh connectivity among the network appliances.

In various embodiments of the invention, the traffic flow state information is maintained within the cluster of peered network appliances by synchronizing local traffic flow state tables among the network appliances. This may be done through an exchange of cluster management messages among the network devices. The cluster management messages convey information about traffic flows to be installed or removed from the traffic flow state tables. The cluster management messages may also convey actions to be associated with the traffic flows, such actions dictating how network traffic associated with respective ones of the traffic flows are to be handled by the network appliances. For example, these actions may include forwarding the network traffic to that one of the network appliances which originated an associated one of the connection management messages; statically bypassing the network traffic associated with a respective one of the network traffic flows; and dynamically bypassing the network traffic. Some of the cluster management messages may include commands exchanged among the network appliances regarding one or more of the network appliances joining or leaving the cluster.

Further embodiments of the present invention provide for receiving, at a first network device, network traffic associated with a network traffic flow, consulting a traffic flow state table to determine whether or not the network traffic flow is associated with a peer network device of a cluster to which the first network device belongs and, if so, forwarding the network traffic to the peer network device, otherwise acting on the traffic flow to which the network traffic belongs at the first network device according to the configured policy (e.g. either intercepting or bypassing the traffic), and informing other network device members of the cluster about the action (e.g. intercept or bypass) that was applied to the first network traffic of the traffic flow. In some cases, informing other members of the cluster to which the first network traffic of the processed traffic flow may involve transmitting one or more cluster control messages specifying the processed traffic flow and associated actions to be taken with respect to the traffic of the processed traffic flow from the first network device to the other members of the cluster.

Also, at each of the other members of the cluster, upon reception of the cluster control messages from the first network device, traffic flow state information as well as the associated action for the processed traffic flow may be maintained as part of a traffic flow state table.

In some situations, prior to processing the traffic flow at the first network device, the traffic flow state table of the cluster may be examined to determine whether or not the network traffic is self-originated from the first network device or from any other member of the cluster and, if so, the network traffic may be bypassed rather than further processing.

The member network devices of the cluster may be peered with one another through an exchange of cluster management messages in which network devices having smaller interne protocol (IP) addresses initiate peering requests to network devices having larger IP addresses.

Still a further embodiment of the invention provides for synchronizing traffic flow state information among peered members of a network traffic device cluster, at least some of the network traffic devices associated with different network segments from others of the network traffic devices, said synchronization occurring through an exchange of cluster management messages conveying, for each traffic flow, an identification of said traffic flow and corresponding action to be taken by a member of said cluster upon receipt of network traffic associated with said traffic flow. These corresponding actions may include one or more of statically bypassing the network traffic, dynamically bypassing the network traffic and forwarding the network traffic to that member of the cluster which originated that one of the cluster management messages describing a corresponding traffic flow of the network traffic.

The traffic flow state information may be encrypted at each of the members of the network traffic device cluster prior to said synchronization, and the members of the network traffic device cluster may be statically defined by a network administrator.

These and other embodiments of the invention are described further below.

BRIEF DESCRIPTION OF THE DRAWINGS

The present invention is illustrated by way of example, and not limitation, in the figures of the accompanying drawings in which.

DETAILED DESCRIPTION

Described herein are systems and methods for TCP (and some UDP) connection forwarding in asymmetrically routed and other environments. Unlike other TCP connection forwarding schemes, the present invention allows network appliances on different network segments to peer with one another and form clusters within which TCP connections can be forwarded among cluster members for processing. In some embodiments of the invention, the TCP forwarding occurs at Layer-2 (L2), thus avoiding extended processing delays at higher layers at the forwarding appliance. Moreover, the present invention does not rely on the use of packet multicasting and multicast forwarding technology, which is not supported by all legacy routers deployed in the field.

TCP connection forwarding practiced in accordance with the present invention allows a group of clustered network appliances (proxies) to be treated as a single, virtual appliance for purposes of network policy enforcement at the connection level. That is, policies for connections can be deployed at a convenient location on one of the proxies, and through the connection forwarding processes described herein a network manager can be assured that other proxies in the cluster will consistently enforce the designated policies for the specified connections. This is because all of the proxies in the cluster will have state information concerning all of the connections and will either forward a given connection to the proxy handling that connection, or locally enforce the policy for that connection as specified by the proxy which first intercepted the connection. The state information may include connection management actions, which actions may be associated with various factors such as load balancing criteria, traffic shaping criteria, and quality of service criteria for the various connections and/or proxies.

As will be apparent from the discussion below, the present invention permits the construction of load balancers and intelligent switches that can act on information available from OSI Layers 2-4 (L2-L4) to Layer 7 (L7) to distribute traffic. This is in contrast to conventional load balancers and the like which act on only L2-L4 information. For example, embodiments of the present invention allow a first proxy in a cluster to instruct other proxies of the cluster to handle a particular connection in a particular fashion (e.g., bypassing traffic on that connection to a particular destination, forwarding the traffic to the first proxy or even intercepting the traffic and processing the intercepted traffic in a particular manner).

In one embodiment of the present invention, the problem of asymmetric routing (whether unidirectional or bi-directional) is solved by configuring proxy devices to act as layer 4 (L-4) switches and forward traffic to other proxies which are managing connections for which the forwarded traffic is intended. In order to accommodate this traffic forwarding, the proxies form a peering relationship and advise one another about the various connections which each has processed (e.g. intercepted or bypassed). This sharing of information regarding intercepted and bypassed connections preferably occurs prior to the receipt of any return traffic for the connection of interest at any of the proxies. In effect, the peering relationship among the proxies establishes a proxy cluster in which the individual proxies are able to signal one another about the various intercepted and bypassed connections. Full mesh connectivity is provided within this cluster because the proxies may not share a common network domain.

The present invention allows common network security and access policies to be applied to all inbound and outbound traffic that flows through proxy devices (or other security appliances) that are situated at ingress and egress points of an enterprise networks. For convenience, the term proxy will be used herein to describe the network device so situated. However, it should be recognized that in general the present invention is applicable to and may be used in connection with any security appliance, such as enterprise secure proxies or firewalls or other types of network appliances that can define and enforce network access policies.

Figure 2:
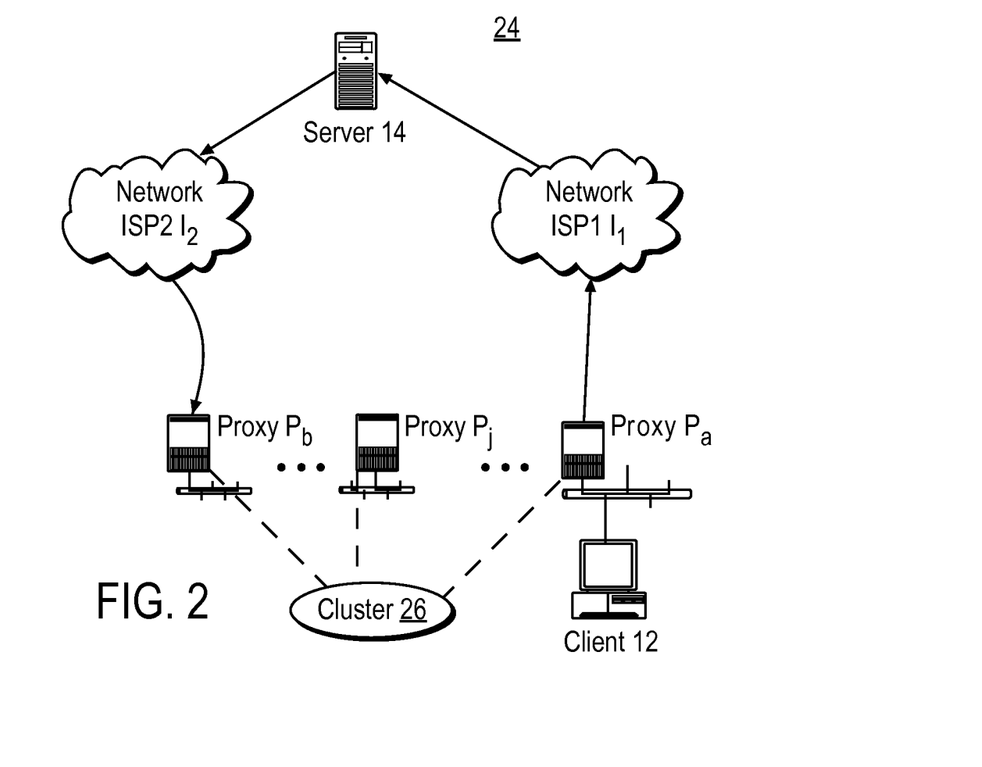
FIG. 2 illustrates the use of a proxy cluster in a multi-ISP environment in accordance with an embodiment of the present invention.

The process of forwarding traffic to a proxy that intercepted the related connection is referred to herein as TCP (transmission control protocol) connection forwarding (though other forms of communications, such as UDP flows, may also be handled). FIG. 2 depicts a multi-ISP environment 24 in which TCP connection forwarding is facilitated through the use of a proxy cluster with full mesh connectivity 26. The multi-ISP environment 24 includes a number of proxy devices $P_a, P_b, \ldots P_j$, each connected to a different network segment but peered together via cluster 26. Proxies $P_a$ and $P_b$ provide connectivity for client 12 to server 14 via ISPs $I_1$ and $I_2$, respectively.

With client IP spoofing engaged, a connection from the client 12 to server 14 is intercepted and terminated by $P_a$, and the outbound connection from $P_a$ to server 14 via $I_1$ carries the client's IP address. The return traffic from server 14 is received at proxy $P_b$ from $I_2$. Because proxies $P_a$ and $P_b$ are peered via cluster 26, proxy $P_b$ has been notified of proxy $P_a$'s connection to server 14 and client 12's connection to $P_a$, and can now associate the return traffic with that connection. The association may be maintained by way of a connection state table or other convenient data structure and the methods by which the proxies keep one another informed of various connection states is discussed in detail below. Depending on the action associated with the connection of interest as informed by proxy $P_a$, proxy $P_b$ may forward the return traffic to client 12 directly, or forward the traffic to proxy $P_a$ for further handling. Importantly, the traffic is not rejected and connections do not time out because the peered proxies are able to associate the return traffic with the associated connections for which the traffic is intended.

The TCP connection forwarding solutions employed to solving the asymmetric routing problem apply equally well to load balancing situations. Consider, for example, the deployment scenario depicted in FIG. 3. Proxy 28 is inline for all traffic originating from clients $30_1, 30_2, \ldots 30_n$ through network $36_1$ to servers $32_1, 32_2, \ldots 32_m$, via network $36_2$, and for all return traffic originating from the servers to the clients. The other proxies $34_1, 34_2, 34_3, 34_4$ have independent connectivity to both the clients and to the servers.

Figure 3:
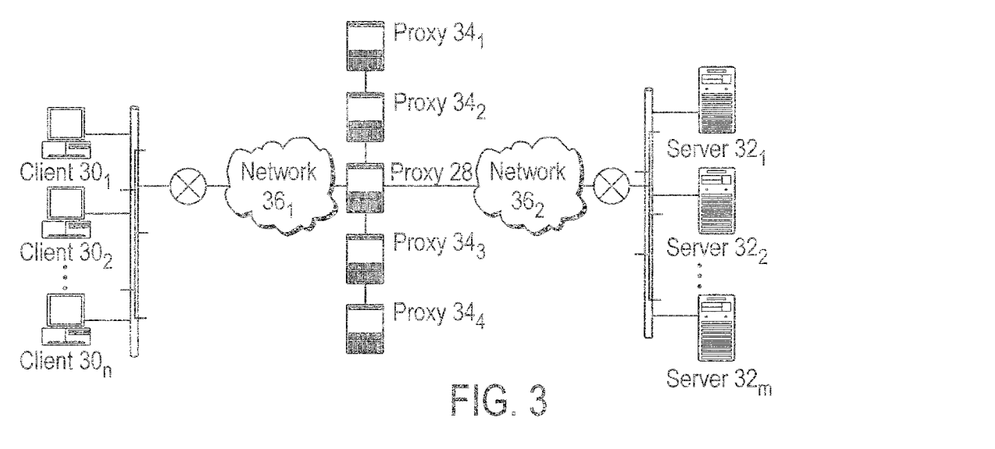
FIG. 3 illustrates the use of a proxy as a load balancer in accordance with an embodiment of the present invention.

In this deployment scenario, proxy 28 acts as a load balancer and distributes incoming client connections among the other proxies in the chain. Typically, load balancers act on information at L2-L4, however, if the various proxies are peered in accordance with the present invention, proxy 28 acting as a load balancer will be able to make load balancing decisions on criteria up through and including L7. For example, this may include load balancing decisions based on criteria such as authentication of a client, time of day, authentication of a user, or request/resource requirements.

Figure 4:
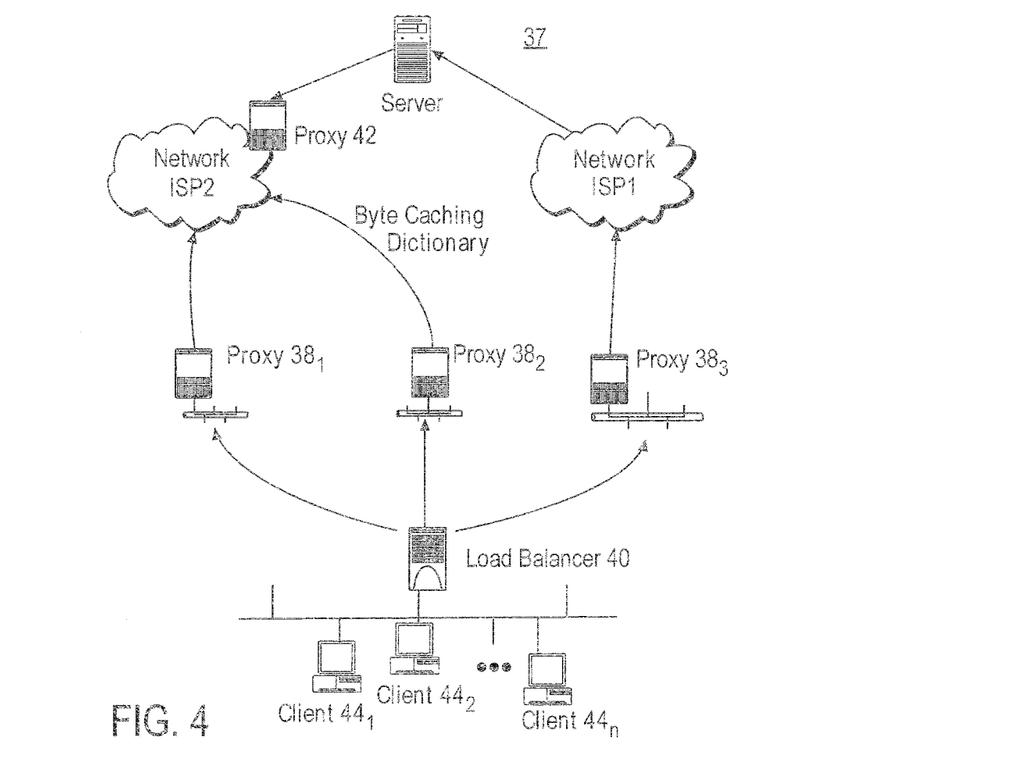
FIG. 4 illustrates the use of a proxy cluster and load balancer in accordance with yet a further embodiment of the present invention.

Another load balancing scenario is illustrated in FIG. 4. In this network 37, client connection requests are distributed to various proxies $38_1, 38_2, 38_3$, by an L4-switch 40 acting as a load balancer. This connection load balancing is problematic when application delivery network (ADN) transparent tunnels are deployed, for example between proxy $38_2$ and proxy 42.

ADNs have become more and more common among large enterprises where there is a need to deliver business applications to remote users and/or branch offices. To provide for acceleration within an ADN (or other network), a split proxy configuration is often used. A split proxy is essentially a pair of proxies installed across two computer-based systems. Since they are effectively two parts of the same program, they can communicate with each other in a more efficient way than they can communicate with a more standard resource or tool, such as a website or browser, for example through the use of byte caching. Byte caching (or dictionary compression as it is sometimes called) eliminates the repeated transmission of sequences of bytes sent over TCP connections. That is, instead of transmitting the repeated sequences, an indicator or tag can be used instead. So long as the indicator or tag is smaller than the original data sequence, bandwidth is saved by transmitting only the indicator. Such an exchange may take place over a byte cache tunnel between two ends of a split proxy.

In the context of the present scenario, proxy $38_2$ may have been consistently servicing client $44_2$, and thus have built up a considerable byte-cache dictionary with proxy 42 over a long period of time (thus providing a good compression ratio). Perhaps due to a configuration or a priority change at the load balancer 46, the next connection request from $44_2$ may be distributed to proxy $38_3$ instead of proxy $38_2$. Because proxy $38_3$ has not previously serviced client $44_2$, proxy $38_3$ will not have the right dictionary to gain the same compression ratio. Without the TCP forwarding provided by the present invention, this performance degradation will be incurred. With the use of the present invention, however, when proxy $38_3$ receives the request from client $44_2$, proxy $38_3$ may consult the connection state table and make an intelligent decision to forward the request from client $44_2$ to proxy $38_2$ for further processing. This way, proxy $38_2$ can continue to handle the connection and no performance degradation (other than perhaps the minimal delay associated with the extra hop to proxy $38_3$) will be experienced.

In one embodiment of the present invention, proxy cluster membership is statically defined and coded into each proxy that belongs to the cluster. The cluster membership information may be configured through a command line interface (CLI) to the individual proxies, for example in manner similar to DNS server configuration. In other embodiments, however, the cluster membership may be dynamically discovered and maintained by the proxy cluster members themselves.

Cluster membership may change dynamically during operation. In other words, those proxies that are identified in a statically-configured membership list may leave the cluster either voluntarily (e.g., through manual configuration), or involuntarily (e.g., due to a hardware or software failure). In addition, proxies that become operational after a cluster has already been established may be added to that cluster while it is in operation.

For each newly operational proxy that is to join the cluster, a CLI-based configuration command may be used to install an IP address of a single cluster member into the joining proxy. This allows the joining proxy to retrieve the full cluster membership information from a single member and subsequently establish a peer relation with the remaining members of that cluster.

Each proxy will attempt to connect to every other peer in the cluster membership list. Peering request collision can occur when a proxy tries to connect to another peer while that other peer tries to connect to it at the same time. One way to resolve such collisions is to establish a rule-based scheme in which, for example, the proxy with the larger host ID part of its IP address will proceed with its connection while the proxy with smaller host ID terminates its attempt. Other strategies are discussed below.

As discussed above, packets of an active TCP flow may be asymmetrically routed through different paths dynamically during the lifetime of that TCP flow. Therefore the proxy that intercepts a connection must prepare for such asymmetric routing as soon as it transmits the upstream connection request, i.e., the cluster must be ready as soon as the intercepting proxy sends the TCP SYN packet on the upstream TCP connection. This preparation involves the intercepting proxy informing its cluster peers about the outbound connection just initiated. At the same time, the intercepting proxy must also inform its peers about the incoming connection it just intercepted in case the incoming connection is also asymmetrically routed. These notifications must be sent to peers regardless whether the proxy employs delayed-intercept processing (i.e., establishing the outbound connection with the server before acknowledging the inbound connection from the client) or not.

Similarly, as discussed above the proxy that bypasses a connection must prepare for such asymmetric routing as soon as it forwards the original packet to the originally intended destination, i.e., the cluster must be ready as soon as it forwards the TCP SYN packet. This preparation involves the processing proxy informing its cluster peers about the bypassed connection.

As indicated above, the sharing of connection information among proxy cluster peers preferably occurs prior to the receipt of any return traffic for the connection of interest at any of the proxies. However, the connection notifications may not reach a peer due to, for example, TCP retransmission before the returning traffic reaches that peer. Thus, in accordance with embodiments of the present invention, the peer should be configured to not reset a connection if the peer sees some partial traffic for some connection that it does not yet have any TCP state information for. In addition, each proxy in the cluster should be peered with all other proxies in the cluster in a full mesh topology, inasmuch as any packet of any connection may be routed asymmetrically.

One means of configuring a proxy not to reset a connection if that proxy sees traffic for an unknown connection is to use a hold queue at the proxy. The hold-queue may be regarded as a waiting station. Processing of newly received packets that do not match any of the proxy's existing connections is suspended for a period of time. This is desirable because the subject connection to which these newly received packets may belong might be a connection that is being handled by a peer of the subject proxy (i.e., the one that received the packet). In such a case, the current packet should be processed according to instructions provided by that peer. However, because the subject proxy may not yet have received notice of such a connection from the peer device, the hold queue is used to delay processing of the packet for a period of time to allow such a communication from the peer device to be received.

This processing delay should not be indefinite, however, and upon expiration of an associated timer the subject packet may be retrieved from the hold queue and subjected to further evaluation against the subject proxy's processing rules. The hold queue delay, in essence, allows for a relatively widely dispersed cluster of peer appliances. The longer the delay, the larger the coverage area (in geographic or logical network hop terms) of the cluster. That is, the longer the packets are held in the hold queue, the farther the receiving proxy can be from the proxy responsible for the connection to which the subject packet belongs, because there will be sufficient time for the notice from that peer device to reach the receiving proxy. This delay time must be balanced against competing needs to process the packet before the packet sender retransmits the packet or times out the connection.

In one embodiment of the invention, the cluster management messages are exchanged reliably by means of establishing peer connections over the TCP protocol. Once the peer relation has been established successfully, the peers synchronize respective local connection tables. Each local connection table is a table that includes all of the intercepted and bypassed client connections. Intercepted connections are those for which a proxy actively processes the connection, while bypassed connections are those for which traffic is passed directly to a server/client without processing at the proxy. The bypassed client connections may include both static bypassed and dynamic bypassed connections. UDP flows may also need to be included.

Connection information may be synchronized among the proxy cluster peers over a control channel by means of cluster connection management messages (CCMMs) and cluster membership management messages (CMMMs). In one embodiment of the invention, three message types are defined for a cluster, as listed and described in Table 1, below.

TABLE 1

Cluster Connection Management Message Types

| Message Type | Action Type | Description |
| --- | --- | --- |
| INSTALL_CONNECTION (CCMM) | FORWARD | This command installs state about a connection into a peer. Traffic belonging to this connection will be forwarded to the originator of this message. |
| | STATIC_BYPASS | This command installs state about a statically bypassed connection into a peer. |
| | DYNAMIC_BYPASS | This command installs state that dynamic bypass is active into a peer. Unlike the above two messages, this does not refer to a specific connection. Instead, it refers to all connections from a specific client to a specific server and port. |

TABLE 1-continued

Cluster Connection Management Message Types

| Message Type | Action Type | Description |
|---|---|---|
| REMOVE_CONNECTION (CCMM) | FORWARD | This command removes state about a forwarded connection from a peer. |
| | STATIC_BYPASS | This command removes state about a statically bypassed connection from a peer. |
| | DYNAMIC_BYPASS | This command removes state about dynamic bypass from a peer. |
| CLUSTER_PEER_SYNC (CMMM) | PEER_JOIN | This command indicates the sender is in the process of establishing a peering relation with the receiver. This command provides a guard against accidental connection to the clustering port. This command is also an indication the sender requests a peer to send over its connection tables that include intercepted connections and statically and dynamically bypassed connections. |
| | PEER_KEEPALIVE | This command queries the liveliness of a peer. |
| | PEER_LEAVE | This command informs peers that the sender of this command is exiting the cluster and is no longer an active member of the cluster. |
| | PEER_REJECT | This command informs a peer that the peering request is denied. The reason for the denial accompanies the PEER_REJECT message. |

As indicated in the above table, there are three action types associated with the INSTALL_CONNECTION message type: FORWARD, STATIC_BYPASS, and DYNAMIC_BYPASS actions. A proxy that intercepts a client request will issue two FORWARD actions to all of its peers. The first FORWARD action installs the client inbound connection from the client to the proxy, and the second FORWARD action installs the server outbound connection from the proxy to the server in the peers. All traffic that belongs to these two connections which arrives at any peer will be forwarded to the intercepting proxy.

To support connection handoff in the ADN transparent tunnel deployment environment discussed above with reference to FIG. 4, the proxy that received the original client request will not issue any CCMM messages to the candidate proxy that it decides should handle the request. Instead, the original request packet is forwarded from the receiving proxy to the candidate proxy directly. Subsequently the candidate proxy may issue the FORWARD action to all members of the cluster once it intercepts the given connection. Note the proxy that performed the request packet forward action will automatically install the connection in its FORWARD table because the client connection request reached it first. The implication is that this proxy will ignore the subsequent FORWARD action because the connection already exists in its FORWARD table.

The STATIC_BYPASS and DYNAMIC_BYPASS actions are useful for situations where one proxy receives a client request and the policy for that request indicates the connection is to be bypassed (either dynamically or statically). In such cases, instead of redirecting return traffic that was asymmetrically routed back to the intercepting proxy, the intercepting proxy can instruct the clustering proxies to bypass the traffic, thus forwarding the traffic towards the requesting client directly. In the case of dynamic bypass, once the proxy issues the packet that indicates a request failure to the client (e.g., an HTTP 401 code), the proxy will immediately inform the other cluster members about the future-to-be-bypassed request.

There are four action types associated with the REMOVE_CONNECTION message type: FORWARD, STATIC_BYPASS, and the DYNAMIC_BYPASS actions. Each action removes a previously installed connection from the corresponding table that is maintained by the peer.

There are four action types associated with the CLUSTER_PEER_SYN message type: PEER_JOIN, PEER_KEEPALIVE, PEER_LEAVE, and PEER_REJECT actions. The PEER_JOIN action serves as a safeguard against accidental connection to reserved cluster peering TCP ports. Once the TCP connection is successful, the peering initiator should issue the PEER_JOIN action as the first exchange so that a peer does not close the connection. In return, for the same reason, the peer should respond with a PEER_JOIN. In other words, the first bytes exchanged between proxy cluster peers should constitute a PEER_JOIN action and its associated data, for both ends of the peer connection. The number of connect attempts to be made for establishing a peering relation to another cluster member before giving up may or may not be configurable by the network administrator.

The PEER_KEEPALIVE action is useful when a configured period of time has elapsed and there is no traffic on the cluster peering connection. In this case, the PEER_KEEPALIVE may be sent by a proxy to probe the liveliness of the other end. Once a member proxy deems its peer as unreachable, then this member proxy will remove all connections (whether bypassed or forwarded) associated with the unreachable peer from its cluster connection database (i.e., the connection table that contains all of the forwarded and bypassed connections of all the active peers of the cluster). The cluster connection database is described in more detail below.

A cluster member that voluntarily leaves a cluster issues the PEER_LEAVE action to all other members. The PEER_LEAVE action is a proactive way of informing other peers to immediately remove all connections associated with the sender of the PEER_LEAVE action.

A proxy transmits the PEER_REJECT action to inform another proxy that its peering request has been denied, for example, because the other proxy is not yet in the cluster membership list. The reason for the rejection may be included in the PEER_REJECT message.

Figure 5:
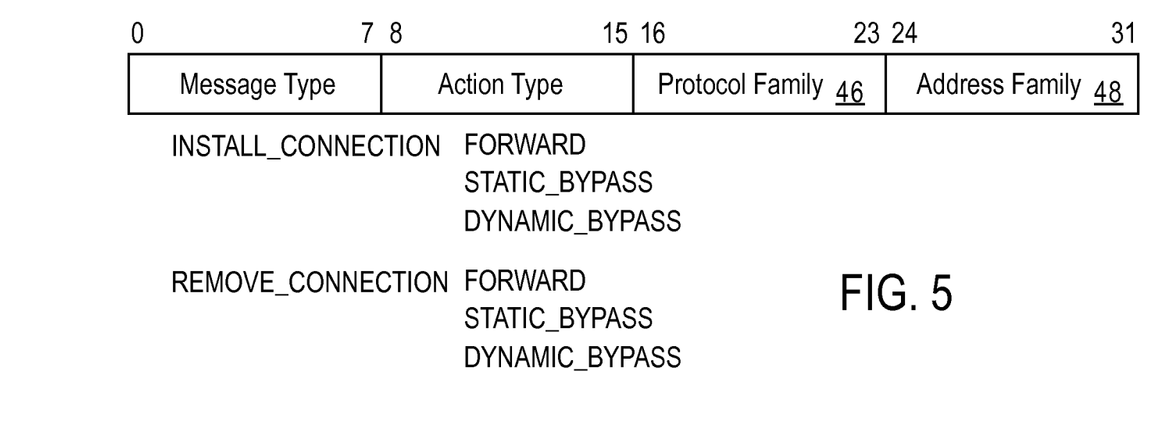
FIG. 5 illustrates a format for one example of a cluster connection management message in accordance with an embodiment of the present invention.

In one embodiment of the invention, each CCMM packet has a 4-byte header. The first 2 bytes are common, and the content of the subsequent 2 bytes depends entirely on the message type. FIG. 5 illustrates one example of a packet format for the INSTALL_CONNECTION and REMOVE_CONNECTION message types. The Protocol Family field 46 specifies, for example, whether the connection information is for a TCP connection or a UDP connection. The Address Family field 48 specifies, for example, whether the IP addresses of the connection are IPv4 or IPv6 addresses.

Figure 6A:
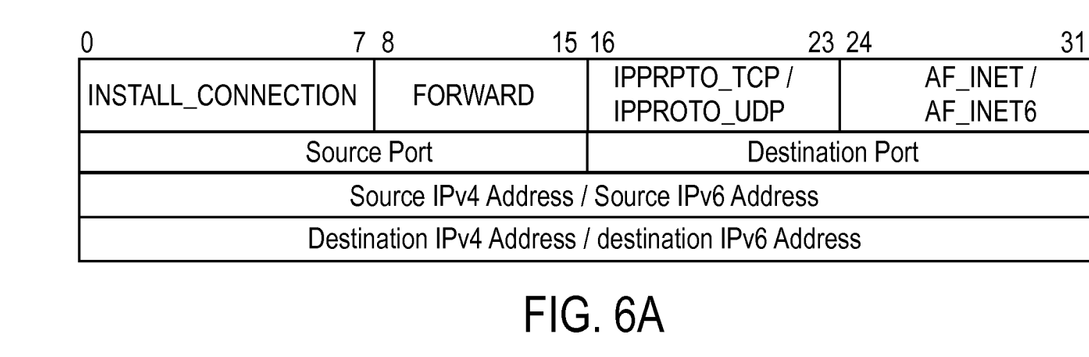
FIGS. 6*a* and 6*b* illustrate formats for examples of cluster membership management messages in accordance with embodiments of the present invention.
Figure 6B:
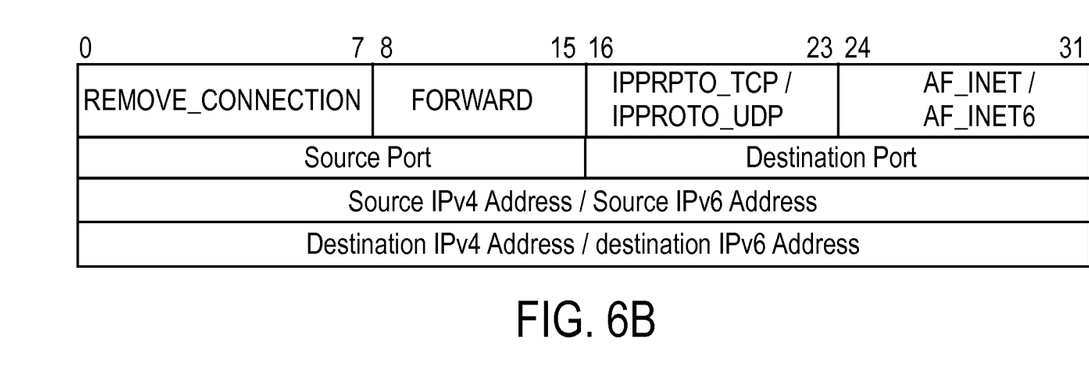

FIGS. 6a and 6b illustrate examples of CCMM packets carrying IPv4/IPv6 connection information to be forwarded by the peers. The size of the source and destination ports is fixed. Note that a 4-byte header precedes each connection information block. In other words, if, for example, there are two blocks of connection information then there will be two 4-byte headers. As can be seen from the illustration, the size of the packet can be derived from the header itself. For example, if the message type is INSTALL_CONNECTION, the protocol is TCP, and the address family is IPv4, then the size of the packet is 32 bytes large. On the other hand, if the address family is IPv6, then the size of the packet is 40 bytes (4-byte header, 4 bytes for ports, 16-byte source IPv6 address, 16-byte destination IPv6 address).

Figure 7A:
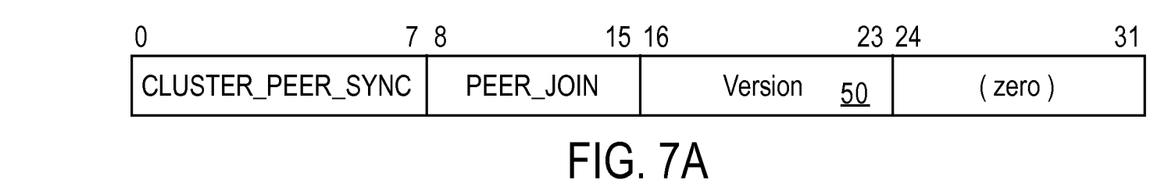
FIGS. 7*a*-7*d* illustrate examples of packet formats for certain cluster connection management messages in accordance with embodiments of the present invention.
Figure 7B:
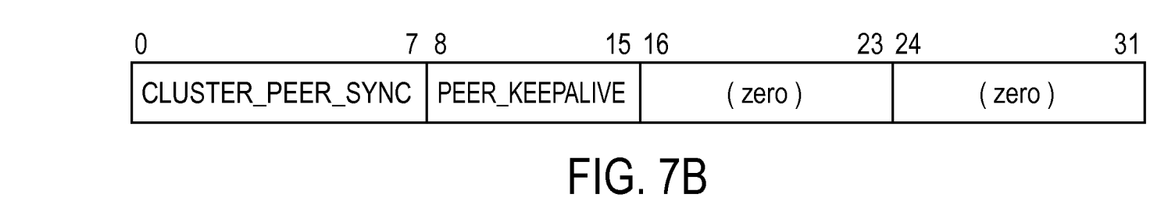
Figure 7C:
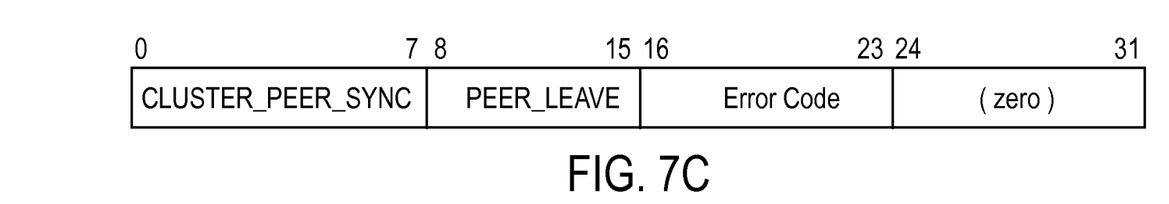

FIGS. 7a-7c illustrate the packet formats for the CMMM CLUSTER_PEER_SYNC message type. Of course, these packet formats (like the ones discussed above) are optional and in this instance packet formats may change depending on the Version field 50. Therefore, at the time of establishing the peering relation, the Version field must be examined by each peer to determine if the peers are compatible. Incompatible peers will result in the failure of peering establishment. The Version field 50 is carried in the PEER_JOIN message only.

Figure 7D:
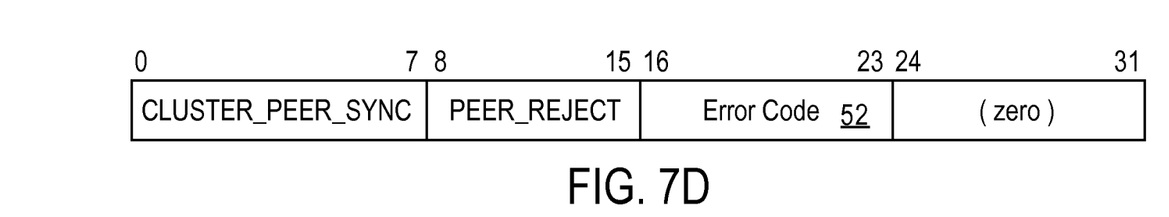

For the PEER_REJECT message shown in FIG. 7d, the Error Code 52 indicates the reason for peering failure. One defined reason is ERR_PEER_NOT_AUTHORIZED, which means a peer is not in the cluster membership list. Another reason for peering rejection is version number mismatch. In this case the error code may be ERR_PROTO_VERISON_MISMATCH. That means the proxy that receives a PEER_JOIN message should either respond with a PEER_JOIN that carries the same version number, or responds with a PEER_REJECT with the ERR_PROTO_VERSION_MISMATCH.

After a proxy has established a peer connection with another proxy, if an unrecognized CMMM message is received on that connection, then that connection will be closed. The is because at the point where the bad CMMM message is read, the proxy can no longer parse the remaining bytes received on that socket. In this case the proxy will issue a PEER_LEAVE action to its peer with error code ERR_PEER_BAD_MESSAGE.

As indicated above, a special TCP port may be assigned for the establishment of a proxy cluster. Preferably, the port number for this cluster purpose is assigned at the time of manufacture of the proxy and a cluster daemon created to listen on this special TCP port for incoming peering requests.

At the completion of the cluster establishment, all of the proxies belonging to the cluster will have the same connection table containing all of the connections that are intercepted and bypassed by every proxy of that cluster. One method to synchronize the connection table information is to have each proxy exchange it's its local connection table with each peer at the peering time. Once the cluster is fully established, each proxy maintains a cluster connection database covering all of the active peers. New proxies can join the cluster and the peer table will be updated accordingly.

As discussed briefly above, each proxy in a cluster may transmit periodic PEER_KEEPALIVE messages to each of its peers in order to probe the liveliness of the peer. The connections associated with a peer are removed from the local connection table if the peer becomes non-responsive. The number of probes to send and the probe interval may be global parameters, rather than per peer parameters (though in some embodiments a per peer arrangement may be used). Further, in some cases these variables may be user configurable, while in other cases they may not be so configurable. Each proxy may unilaterally transmit PEER_KEEPALIVE messages on its own tinier, and the other side treats this peer as unresponsive if that side does not hear any traffic for some fixed time interval (for example, three times the PEER_KEEPALIVE interval). A proxy may reset its PEER_KEEPALIVE transmission timer each time an INSTALL_CONNECTION or REMOVE_CONNECTION message is received. The periodic timer may also reset when a PEER_KEEPALIVE is triggered. In one particular embodiment, the PEER_KEEPALIVE interval is set to 5 seconds, but this is not critical to the present invention and other time intervals may be used.

The TCP <source IP, source port, destination IP, destination port> 4-tuple constitutes the TCP connection state information maintained by each proxy for each peer connection. Information regarding TCP connections that are present at the proxy that intercepted client traffic is shown in the following Table 2.

TABLE 2

Connection Table of the Intercepting Proxy

| Connection | Direction | Responsible Proxy |
|---|---|---|
| <client-IP, client-Port, server-IP, server-Port> | Client-to-Proxy | Proxy A |
| <client-IP, proxy-Port, server-IP, server-Port> | Proxy-to-Server | Proxy A |

The Client-to-Proxy connection is present at every proxy of the cluster to handle possible asymmetric routing of the inbound connection. If client IP spoofing is used and a server-bound connection is initiated, then the Proxy-to-Server connection must also be replicated in every proxy of the cluster. Note with client IP spoofing, although the outbound traffic carriers-carries the same source IP address, server IP address and server port, the source port is distinctive and is different from the port number of the inbound connection.

A connection database for connections that are processed by the peers of the cluster may have the format shown in Table 3.

TABLE 3

Connection Database

| Connection Information <source-IP, source-Port, destination-IP, destination-Port> | Protocol | Action | Originating Proxy | Outgoing Interface |
|---|---|---|---|---|
| <src-A, src-PA, dst-B, dst-PB> | TCP | Forward | IP address | Interface pointer A |
| <src-C, src-PC, dst-D, dst-PD> | TCP | Dynamic Bypass | IP address | N/A |
| <src-E, src-PE, dst-F, dst-PF> | UDP | Static Bypass | IP address | N/A |

In one embodiment of the present invention, the connection database is maintained as a hash table and is divided into two sections. A peer connection is inserted into the first section of the database when traffic for that connection is observed for the first time. When additional traffic is seen on that peer connection, then that connection is moved into the second section of the database. The idea is to maintain a smaller lookup section for those active peer connections to allow for search efficiency. The Originating Proxy column may be used mainly for diagnostics, and it stores the IP address of the proxy that informed the proxy at which the subject connection database is stored about a particular connection.

The peer connections may be maintained in IPFW-based flow tables, as described in co-pending U.S. patent application Ser. No. 11/829,740, filed 27 Jul. 2007, assigned to the assignee of the present invention and incorporated herein by reference.

In one particular embodiment of the present invention, traffic of a peer TCP connection may be forwarded through IP-in-IP tunneling (e.g., as defined in RFC 1853). Of course, this is just an example of the use of the present invention, but in such cases a proxy creates an IP-in-IP pseudo interface each time it establishes a peering connection to another proxy. The IP tunnel end points are its address and the address of its peer. The pseudo interface may be maintained in the connection database as the "outgoing interface" as shown in Table-3. Other embodiments of the present invention may make use of different connectivity.

As further described in the above-cited co-pending patent application, a special firewall rule may be created for installing a TCP cluster connection related packet classification object within which the connection database may be located. In essence, the classification object will be queried when packets are received at the proxy. The classification object will determine if an incoming packet needs to be forwarded to a peer (e.g., by consulting the connection database), and if so, the outgoing interface (the IP-in-IP tunnel pseudo interface) is returned (from the connection database). At this point the packet will be transmitted over the returned interface.

In situations where a proxy receives traffic and performs a connection lookup in the connection database but does not find a match, then the traffic is analyzed to determine if the local proxy was in fact the originator of the subject traffic. Hence, the proxy should bypass this self-originated traffic. This scenario is further explained through an example shown in FIG. 8.

Figure 8:
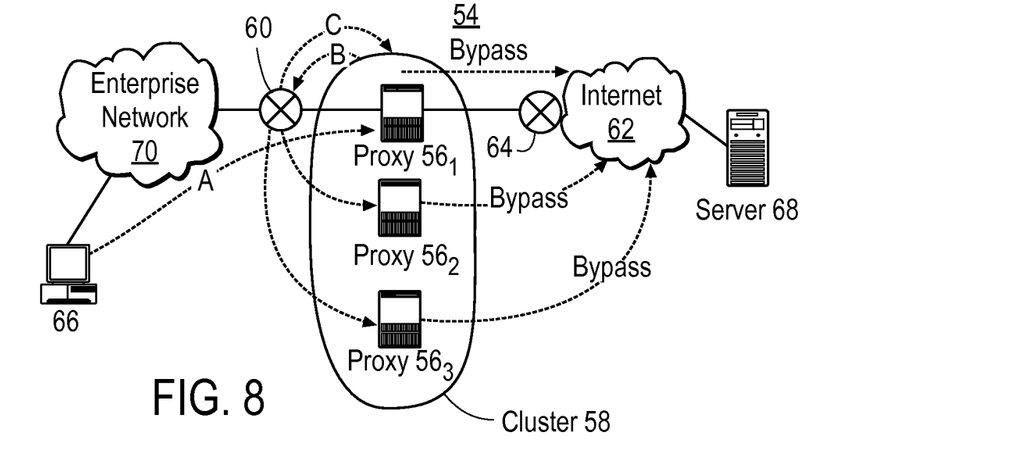
FIG. 8 illustrates a network configuration in which self-originated traffic may be received at a proxy cluster.

In the network 54 shown in the illustration, proxies $56_1$, $56_2$ and $56_3$ are all part of the same cluster 58. Assume for purposes of this example that router 60 is configured as the default router on proxy $56_1$. The default router for access to the Internet (or other outside network) 62 is router 64, which is known to router 60 but not known to proxy $56_1$. Proxy $56_1$ is deployed in-line between routers 60 and 64.

Now assume client 66 makes a connection to a server 68 outside of enterprise network 70, with the connection 4-tuple <Client-IP, Client-Port, Server-IP, Server-Port>. Dashed line A in the illustration refers to this connection. Proxy $56_1$ intercepts this connection and, because client IP spoofing is in use, the outbound server connection will carry the client's IP address as the packet source address. Since router 60 is configured as the default router on proxy $56_1$, proxy $56_1$ will send the outbound connection with the 4-tuple <Client-IP, Proxy-Port, Server-IP, Server-Port> towards router 60, as represented by dashed line B.

In accordance with the present invention, at the same time outbound connection B is sent from proxy $56_1$, this server-bound connection will be installed at proxies $56_2$ and $56_3$. In other words, if proxies $56_2$ and $56_3$ were to receive any return traffic then these proxies will forward the traffic to proxy $56_1$.

Router 64 is the next-hop from router 60's perspective, so router 60 sends the connection back towards router 64, as indicated by dashed line C. However, because proxy $56_1$ is inline, it will receive the packet that it originated. In this case, proxy $56_1$ must recognize this connection and bypass this packet, as represented by dashed line "Bypass". Likewise, if the traffic somehow reached proxy $56_3$ due to asymmetric routing (not shown in the figure), then proxy $56_3$ should also bypass the traffic instead of forwarding this proxy $56_1$-originated traffic back to proxy $56_1$. The same applies to proxy $56_2$ if the same type of traffic were to reach that device.

There are situations where multiple proxies of a cluster may receive the same client request simultaneously. In this case, both proxies will attempt to handle the client request and inform other peers to forward the client traffic, which may result in data interleaving. Consider the example shown in FIG. 9.

Figure 9:
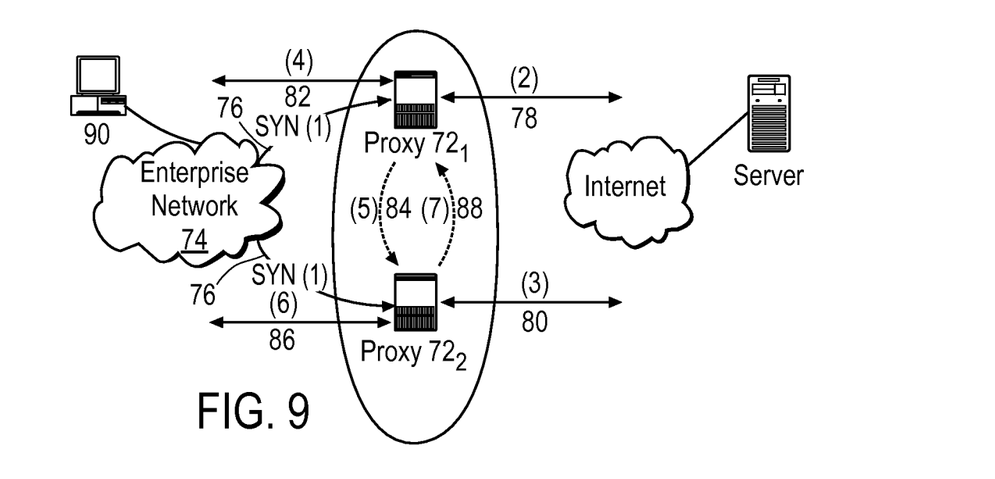
FIG. 9 illustrates a situation involving multiple interceptions of a single client request within a proxy cluster.

In this example, the client request (SYN packet 76) reached both proxy $72_1$ and $72_2$. This may be the result of packet replication in the enterprise network 74, or due to SYN packet retransmission and asymmetric routing. In the delayed interception case, there is a chance the client SYN packet could be retransmitted multiple times.

As shown in the illustration, proxy $72_1$ makes the server-bound connection 78 first, followed by proxy $72_2$ making another server-bound connection 80 for the same client request. Proxy $72_1$ establishes its server-bound connection first and then completes the client-bound connection 82. Then, through a CCMM 84, proxy $72_1$ informs proxy $72_2$ to forward further client request packets to proxy $72_1$. Similarly, proxy $72_2$ would eventually complete its server-bound connection 80 and then complete a client-bound connection 86. Proxy $72_2$ would also use a CCMM 88 to inform proxy $72_1$ to forward the same client traffic to proxy $72_2$.

This poses a problem. Traffic from the various proxies can reach client 90 at different times and the client may accept this traffic and interleave the data transmitted by each proxy. This erroneous content would be difficult to diagnose if the content is not meant for visual inspection.

The present invention can resolve this problem when the proxies operate using delayed intercept (for example, as described in co-pending U.S. patent application Ser. No. 11/780,432, filed 19 Jul. 2007, assigned to the assignee of the present invention and incorporated herein by reference). In such a situation, the proxy that receives the SYN request will immediately send out an INSTALL_CONNECTION message to its peers and assume responsibility for the connection. This approach handles the situation where the retransmitted SYN went to another proxy. If two proxies performed this installation action at the same time, then the proxies can apply the "larger IP will handle the connection" rule to determine which proxy will be responsible for the client connection. This mechanism works because using delayed intercept the proxy will not complete the 3-way handshake with the client until the server-bound connection is established. In other words, there is enough time to resolve the tie-break mechanism.

If the delayed intercept feature is not enabled and the client request reaches multiple proxies at the same time, due to network packet replication (which is very rare occurrence), then the above-described mechanism will not resolve the situation and the client request should be permitted to time out so that a new request can be generated.

In order to facilitate the clustering functionality described herein, proxies are configured to manage a set of TCP sockets, each connected to a cluster peer. The proxies listen on the cluster peering socket for incoming peering requests originated from other proxies. Proxies also maintain periodic timers for each connected peer, which timers are used for triggering PEER_KEEPALIVE messages to be sent to each peer. As discussed above, the PEER_KEEPALIVE message is used when the peering connection has been idle for the duration of the periodic timer interval.

In addition, proxies are configured to maintain peer state in a per-peer data structure. In general, a proxy may maintain various state information about its peers, and each state may have a set of actions associated with it in terms of peer connection management and processed connection management. For example, a peer state table may define states for peers that are joining or leaving and those which are established. In the joining state, the only traffic that is expected from a peer is the PEER_JOIN message. The peer state transitions to the established state once that message is received from the peer. A peer connection goes to the leaving state either when a PEER_LEAVE message is received on the peer socket, or when the PEER_KEEPALIVE determines a peer is no longer reachable. Connection information is not transmitted to peers that are in the joining and leaving states.

Source port selection is an important aspect of proxy operation when client IP spoofing is enabled at the proxy. Because the server-bound connection has the client IP address as the source address, and if the selected source port matches one of the local connections at the client, then if the proxy were to go down and fail-over to a "hard wire" mode, traffic from the server destined to the proxy would reach the client directly instead. In such cases a TCP ACK storm between the client and the server may result. Recall also the scenario described above with reference to FIG. 8. The proxy must use the outbound source port as the mechanism to distinguish self-originated connections. If the selected source port is the same as the client-bound connection, then the proxy will not be able to differentiate client-originated versus self-originated connections. The importance of source port selection is amplified even further when connection forwarding cluster is used. The selected source port must not match any outbound connections that belong to other proxies of the same cluster. Otherwise, if asymmetric routing takes place, then a proxy will be unable to distinguish whether the traffic is destined for itself, or for another proxy in the cluster.

In light of the importance of source port selection for outbound connections, the present invention provides for such selections based on the source port used by the client's incoming connection. In one embodiment of the invention, if the source port used by an incoming connection is a non-privileged port (e.g., source port number>1024), the proxy is configured to use the following mapping:

$$source\_port=((client\_port+16383)\%(65536-1024))+1024.$$

The 16383 value is chosen primarily to find a source port as far away as possible from the client's port so that the likelihood of any later connections from that client to the same server colliding with outbound connections using a source port selected by the proxy is small. A 16K offset was chosen to allow for two proxies (for AND considerations) between the client and the server. In other embodiments of the invention the offset may be 21K, for example. The 1024 offset is used to avoid privileged ports if the client did not select a privileged one.

If the source port used by the incoming connection is a privileged port (e.g., port number 1-1023), the proxy is configured to use the following mapping:

$$source\_port=((client\_port+127)\%(1024-512))+512$$

If the client selected a privileged port then the proxy preferably selects a privileged port. However, in this example selection of one of the first 512 privileged ports is avoided, as many conventional, well-known services (e.g. HTTP) use these ports and a client generally would not use these ports.

After mapping the client's port to a source port, the proxy checks its TCP connection table to ensure there are no outgoing connections with the 5-tuple (protocol, client ip, source_port, server IP, server port), as well as no incoming connections with the 5-tuple (protocol, server ip, server port, client ip, source_port). Mapping a client port to a source port is necessary whenever the proxy is deployed inline and client IP spoofing is enabled.

Similarly, the proxy should examine the connection tables maintained for TCP connection forwarding to ensure that there is no collision. In some cases the proxy may be configured to also examine tables of bypassed connection. However, in some cases it may be preferable to avoid such look ups as they may impede performance. Moreover, there may be bypassed connections that never pass through the subject proxy, and so such a look up is not guaranteed to resolve potential collisions with all bypassed connections.

Each proxy is configured to retrieve its connection information that contains intercepted and bypassed connections to all of its peers. However, there may be tens of thousands of connections, and many of these connections may be short lived. The intercepted connections and the bypassed connections are maintained in separate tables. In other words, the tables can change dynamically while the retrieval process is in progress.

To accommodate this situation, connection information may be retrieved from the network stack through an appropriate interface. During connection table synchronization, snapshots of the connection tables are made and transmitted to each peer. Changes made to these tables after the table snapshots are taken may be distributed as separate notifications after the tables have been transmitted to the peers.

In some embodiments of the present invention, a connection initiation tie-breaker rule may be employed so that a proxy with a smaller IP address will make an active connection to a proxy with a larger IP address. But in order to handle situations where proxies may be down and/or may have left a cluster (to later rejoin), every proxy should try to connect to every other proxy, at least initially. This connection method is best understood with reference to FIG. 10.

Figure 10:
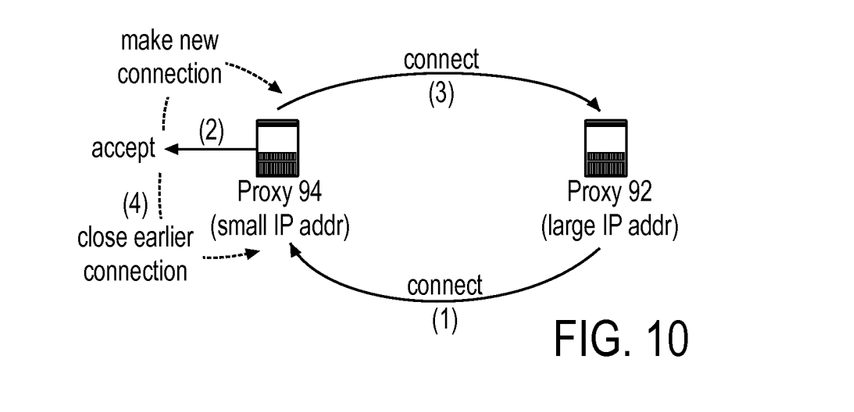
FIG. 10 illustrates a peering relation establishment connection sequence for proxy cluster peers according to an embodiment of the present invention.

In this case, proxy 92, with the larger IP address, connects to proxy 94, which has a smaller IP address. Once this connection completes and proxy 94 accepts the socket, proxy 94 will be able to determine that proxy 92 in fact has a larger IP address. Because the connection initiation tie-breaker rule states the proxy with the smaller IP address should make active connection to the proxy with the larger IP address, then if proxy 94 does not already have an outgoing TCP connection request to proxy 92, it initiates one. At approximately the same time, proxy 94 will terminate the incoming proxy 92-to-proxy 94 connection. Only a single TCP connection between proxies 92 and 94 is used for the purpose of cluster peering.

It is possible that proxy 94 successfully initiates a TCP connection to proxy 92 and issues a PEER_JOIN command on the connection, but for some reason proxy 92 may not respond with a PEER_JOIN command of its own. The PEER_KEEPALIVE command is sent as soon as the TCP connection is established. While proxy 94 waits for the PEER_JOIN response from proxy 92, another peering request may be received from proxy 92 (e.g., perhaps due to proxy 92 rebooting). In such case, proxy 94 will close the previous peer connection and establish another peer connection to proxy 92.

When a proxy determines a connection request needs to be either intercepted or bypassed, the proxy will synchronize this information with all peers of the same cluster. The proxy can synchronize the connection information before making the outbound connection, or the proxy may make the outbound connection first then synchronize with its peers. The success of the client request may differ depending on which approach is taken.

Under the first approach, the connection is likely to succeed (if the client does not timeout). This is because the connection state will have been created on every proxy by the time the return traffic arrives at the cluster. Of course, in this approach the proxy must send the connection information on each peer TCP socket followed by the initiation of the outbound connection. If delayed intercept is enabled on the proxy service, there is an increased chance that the client will time out and give up. This translates into higher overhead because the proxy must subsequently inform its peers to remove the incomplete connection from their tables.

On the other hand, if the proxy initiates the outbound connection first, followed by connection synchronization, then if a peer proxy does not receive the connection state information in a timely fashion (e.g., due to TCP retransmission), it is quite possible that the peer proxy will reset the subject connection if the return traffic arrives at that peer proxy. Nevertheless, in some embodiments of the present invention this second approach, i.e., initiation of the outbound connection first followed by connection synchronization, is preferred. The assumption is that the time required for a packet to travel two edges of a triangle (proxy, peer, server) is longer than the time required to traverse a single edge (triangular routing). This may not always hold true due to the variations in link speed/delay but often it will be the case. To safeguard against unwarranted connection resets, the proxies may be configured to wait for some time before deciding to reset a connection. The waiting time may be two maximum round trip transmission times (RTTs) between the cluster peers.

In some situations, a proxy belonging to a cluster may be rebooted, leaving stale TCP connections in its peers' connection tables. The peer members can detect this situation when the rebooting proxy attempts to establish another peering connection. A peer member will perform a search into its TCP connection table when the new peering request is received. If another peer connection to the rebooted proxy already exists, then the peer member will remove the associated stale connections.

Often the members of a proxy cluster will be deployed within an autonomous system, even though the autonomous system may have multiple address prefixes. Such situations do not necessarily impose a requirement that the peers authenticate one another prior to forming a peering relationship. However, in some cases it may be necessary for the peers to authenticate each other before establishing the peer relation. Methods of authentication may include use of an X.509 certificate or other types of authentication. Further, CCMMs passed over the cluster control channel may require encryption. In other words, the peer-to-peer TCP connections within a cluster may be SSL connections over which cluster control information is exchanged. In this regard, the successful establishment of an SSL connection may suffice as an implicit authentication.

In the case of dynamically bypassed connections being handled by members of a proxy cluster, each dynamically bypassed connection has an associated lifetime. However, due to asymmetric routing, traffic for a dynamically bypassed connection may never reach the original proxy that handled the connection. Hence, this original proxy may timeout the bypassed connection and notifies its peers to remove the bypassed connection from their connection tables. Such removal action would be incorrect because the connection may, in fact, remain active.

To accommodate such situations, additional CCMM messages of types QUERY_CONNECTION and REPLY_CONNECTION may be defined. The purpose of the QUERY_CONNECTION message is to inquire of a proxy's peers whether any of those peers is handling active traffic for a particular (bypassed) connection. If so, the peer will inform the sender of the query by returning a REPLY_CONNECTION message.

During the QUERY_CONNECTION period, a timed-out, dynamically bypassed connection will be added into the traffic flow table that contains traffic of unknown states. If, in one embodiment, two times the cluster RTT has elapsed and there is no REPLY_CONNECTION message, then the query originator will generate a REMOVE_CONNECTION message to remove the dynamically bypassed connection. If a REPLY_CONNECTION message is received, then the state of the dynamically bypassed connection will be set to active again and the timeout value reset.

Thus, systems and methods for TCP connection forwarding in asymmetrically routed and other environments have been described. The present invention enables a variety of operations. For example, network conditions within a cluster of peered network devices may be diagnosed simply by examining traffic flow state information maintained at any member network device of the cluster. This is made possible because the traffic flow state information for all flows handled by member devices of the cluster are maintained at all of the member devices.

In the foregoing discussion the present invention has been described with reference to certain embodiments and illustrated examples. However, it should be remembered that these examples are not intended to limit the present invention but instead were provided merely to illustrate certain features of the present invention. Hence, the invention should be measured only in terms of the claims, which follow this description.

Various embodiments of the present invention may be implemented with the aid of computer-implemented processes or methods (a.k.a. programs or routines) that may be rendered in any computer language including, without limitation, C#, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ and the like. In general, however, all of the aforementioned terms as used herein are meant to encompass any series of logical steps performed in a sequence to accomplish a given purpose.

Further, the algorithms and symbolic representations of operations on-data within a computer memory described herein are so used because they are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented with an apparatus to perform the operations described herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and processes presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor or by any combination of hardware and software. One of ordinary skill in the art will immediately appreciate that the invention can be practiced with computer system configurations other than those described herein, including switches, routers, firewalls, network PCs, servers, and the like.

What is claimed is:

1. A method for asymmetrically routing traffic flows comprising:
    authenticating, by each of a plurality of network appliances including a first and a second network appliance, each other network appliance;
    establishing, by each network appliance, a peering relationship with each of the other authenticated network appliances so as to define a cluster of peered network appliances,
    exchanging, by each peered network appliance, traffic flow state information including (i) a source port and a destination port corresponding to each of one or more received traffic flows and (ii) an action corresponding to each of the one or more traffic flows to be taken by a member of the cluster upon receipt of network traffic associated with the traffic flow;
    routing, by the first network appliance, a t least one of the traffic flows in a first direction through a first network; and
    routing, by the second network appliance, the at least one of the traffic flows in a second direction through a second network, wherein the second network is different from the first network.

2. The method of claim 1, wherein authenticating further comprises using an X.509 certificate.

3. The method of claim 1, wherein establishing a peering relationship further comprises exchanging encrypted cluster control management messages among the network appliances.

4. The method of claim 1, wherein establishing a peering relationship further comprises establishing secure socket layer (SSL) connections between the network appliances.

5. The method of claim 1, wherein at least two or more of the network appliances of the cluster are on different network domains.

6. The method of claim 1, wherein the action indicates that a particular one of the one or more traffic flows should be forwarded between two or more of the peered network appliances when flowing in one of the opposing directions.

7. The method of claim 1, wherein the action indicates that the one or more traffic flows should bypass a particular one of the peered network appliances.

8. The method of claim 7, wherein the action indicates that a particular connection in the one or more traffic flows should statically bypass the particular one of the peered network appliances.

9. The method of claim 7, wherein the action indicates that the one or more traffic flows should dynamically bypass the particular one of the peered network appliances for all connections between a particular client and a particular server.

10. The method of claim 9, wherein the action further indicates a lifetime for the dynamic bypass.

11. The method of claim 1, wherein the action indicates that a receiver is to share its connection tables with one or more of the peered network appliances in the cluster.

12. The method of claim 1, wherein one or more of the peered network appliances comprises a proxy device.

13. The method of claim 1, wherein one or more of the peered network appliances performs Internet Protocol (IP) address spoofing of a client associated with at least one of the one or more traffic flows.

14. The method of claim 13, wherein the statically-configured membership list is distributed via command line interfaces (CLIs) of the network appliances.

15. The method of claim 1, further comprising:
    distributing a statically-configured membership list among the network appliances that identifies the two or more network appliances that are to join the cluster.

16. The method of claim 1, wherein the action indicates at least one of: that the peering relationship should be kept alive, that a new network appliance is to join to the cluster, or
    that a particular one of the networking appliances in the cluster is to be removed from the cluster.

17. The method of claim 1, further comprising:
    employing a rule-based mechanism to resolve peering request collisions between the peered networking appliances in the cluster.

18. The method of claim 17, wherein the rule-based mechanism resolves a peering request collision by favoring the peered networking appliance that has a larger host identifier in its network address.

19. A system for asymmetrically routing traffic flows comprising:
   a plurality of network appliances including a first network appliance and a second network appliance;
   a first network connected to the first network appliance;
   a second network, different from the first network, connected to the second network appliance,
   wherein each network appliance is configured to:
      authenticate each other network appliance;
      establish a peering relationship with each of the authenticated network appliances so as to define a cluster of peered network appliances,
      exchange traffic flow state information including (i) a source port and a destination port corresponding to each of one or more received traffic flows and (ii) an action corresponding to each of the one or more traffic flows to be taken by a member of the cluster upon receipt of network traffic associated with the traffic flow,
   wherein the network appliances are configured to route at least one of the traffic flows (i) in a first direction through the first network and the first network appliance and (ii) in a second direction through the second network and the second network appliance.

20. A first network appliance comprising a processor configured to:
   authenticate each of a plurality of other network appliances including a second network appliance;
   establish a peering relationship with each of authenticated network appliances so as to define a cluster of peered network appliances,
   exchange, with each peer network appliance, traffic flow state information including (i) a source port and a destination port corresponding to each of one or more received traffic flows and (ii) an action corresponding to each of the one or more traffic flows to be taken by a member of the cluster upon receipt of network traffic associated with the traffic flow;
   route, by the first network appliance, at least one of the traffic flows in only a first direction through a first network, wherein the at least one of the traffic flows is routed in a second direction through a second network and the second network appliance, wherein the second network is different from the first network.

* * * * *